US010050548B2

(12) United States Patent
Huang et al.

(10) Patent No.: US 10,050,548 B2
(45) Date of Patent: Aug. 14, 2018

(54) NO-BREAK POWER TRANSFER

(71) Applicant: The Boeing Company, Chicago, IL (US)

(72) Inventors: Jian Huang, Everett, WA (US); Thomas F. Currier, Lynnwood, WA (US); Alan Thomas Bernier, Woodinville, WA (US); Ernest H. Kanning, Redmond, WA (US)

(73) Assignee: The Boeing Company, Chicago, IL (US)

( * ) Notice: Subject to any disclaimer, the term of this patent is extended or adjusted under 35 U.S.C. 154(b) by 557 days.

(21) Appl. No.: 14/500,376

(22) Filed: Sep. 29, 2014

(65) Prior Publication Data
US 2016/0094143 A1    Mar. 31, 2016

(51) Int. Cl.
| H02J 9/00 | (2006.01) |
| H02M 7/06 | (2006.01) |
| H01F 27/28 | (2006.01) |
| H01F 27/29 | (2006.01) |
| H02M 1/14 | (2006.01) |
| H02M 3/335 | (2006.01) |
| H02M 3/337 | (2006.01) |
| H02M 5/14 | (2006.01) |

(52) U.S. Cl.
CPC .......... *H02M 7/06* (2013.01); *H01F 27/2823* (2013.01); *H01F 27/29* (2013.01); *H02J 9/00* (2013.01); *H02M 1/14* (2013.01); *H02M 3/3376* (2013.01); *H02M 3/33546* (2013.01); *H02M 5/14* (2013.01)

(58) Field of Classification Search
CPC ........................................................ H02J 9/00
USPC ..... 307/43–45, 64, 70, 82, 85–86, 125, 130, 307/112, 116, 126
See application file for complete search history.

(56) References Cited

U.S. PATENT DOCUMENTS

| 3,873,846 A | * | 3/1975 | Morio | ..................... H02M 1/10 |
| | | | | 307/23 |
| 4,255,784 A | * | 3/1981 | Rosa | ................... H02M 7/1552 |
| | | | | 363/129 |

(Continued)

FOREIGN PATENT DOCUMENTS

| JP | S5963975 A | | 4/1984 |
| JP | 09093833 A | * | 4/1997 |
| JP | 2011200044 A | * | 10/2011 |

OTHER PUBLICATIONS

Monroy et al., "Modeling and Simulation of a 24-pulse Transformer Rectifier Unit for More Electric Aircraft Power System," IEEE Electrical Systems for Aircraft, Railway and Ship Propulsion (ESARS), Oct. 2012, 5 pages.

(Continued)

*Primary Examiner* — Adi Amrany
(74) *Attorney, Agent, or Firm* — Yee & Associates, P.C.

(57) ABSTRACT

A method and apparatus for transferring power to a load. An AC-to-DC converter output for an AC-to-DC converter is connected to a filter circuit input in a DC-to-DC converter via a connector such that a no-break power transfer occurs when transferring between providing power for the load by the AC-to-DC converter and providing power for the load by the DC-to-DC converter. The topology of the AC-to-DC converter needs only 21 windings for achieving a 24-pulse transformer rectifier unit.

23 Claims, 8 Drawing Sheets

(56) References Cited

U.S. PATENT DOCUMENTS

| | | | | |
|---|---|---|---|---|
| 4,340,823 A * | 7/1982 | Miyazawa | H02J 9/062 | 307/66 |
| 4,564,767 A * | 1/1986 | Charych | H02J 9/062 | 307/48 |
| 4,709,318 A * | 11/1987 | Gephart | H02J 9/062 | 307/66 |
| 4,745,299 A * | 5/1988 | Eng | H02J 9/062 | 307/64 |
| 4,876,634 A * | 10/1989 | Paice | H02M 7/155 | 363/126 |
| 5,045,989 A * | 9/1991 | Higaki | H02J 9/062 | 363/124 |
| 5,148,357 A * | 9/1992 | Paice | H01F 30/12 | 363/126 |
| 5,255,174 A * | 10/1993 | Murugan | H02M 3/33584 | 318/376 |
| 5,541,827 A * | 7/1996 | Allfather | H02M 3/33576 | 363/17 |
| 5,610,450 A * | 3/1997 | Saeki | G05F 1/56 | 307/43 |
| 5,619,407 A | 4/1997 | Hammond | | |
| 5,710,507 A * | 1/1998 | Rosenbluth | H02J 7/0091 | 219/209 |
| 5,721,481 A * | 2/1998 | Narita | H02J 7/0013 | 307/46 |
| 5,811,895 A * | 9/1998 | Suzuki | H02J 9/061 | 307/116 |
| 5,969,438 A * | 10/1999 | Odaohara | H02J 7/0031 | 307/64 |
| 6,052,291 A * | 4/2000 | Suzuki | H02J 9/005 | 363/21.12 |
| 6,067,243 A * | 5/2000 | Suzuki | H02M 7/2173 | 363/127 |
| 6,122,181 A * | 9/2000 | Oughton, Jr. | H02J 9/061 | 307/66 |
| 6,198,177 B1 * | 3/2001 | Mao | H02J 9/062 | 307/64 |
| 6,198,647 B1 * | 3/2001 | Zhou | H01F 30/14 | 363/154 |
| 6,256,213 B1 | 7/2001 | Illingworth | | |
| 6,414,403 B2 * | 7/2002 | Kitagawa | H02J 7/0068 | 307/66 |
| 6,456,508 B1 * | 9/2002 | Namai | H02J 9/062 | 318/116 |
| 6,504,270 B1 * | 1/2003 | Matsushita | H02J 9/061 | 307/125 |
| 6,577,513 B1 * | 6/2003 | Chang | H02J 9/065 | 307/64 |
| 6,977,448 B2 * | 12/2005 | Kanouda | H02J 9/061 | 307/52 |
| 6,983,383 B1 * | 1/2006 | Saito | H02J 1/108 | 713/300 |
| 7,049,711 B2 * | 5/2006 | Kanouda | H02J 9/061 | 307/66 |
| 7,379,282 B1 * | 5/2008 | Zansky | H02J 1/108 | 361/18 |
| 7,772,953 B2 | 8/2010 | Huang et al. | | |
| 7,772,954 B2 | 8/2010 | Huang et al. | | |
| 7,859,133 B2 * | 12/2010 | Youn | H02J 7/0042 | 307/64 |
| 7,928,701 B2 * | 4/2011 | Usui | H02J 9/061 | 323/206 |
| 8,368,252 B2 * | 2/2013 | Pabon | H02M 7/219 | 307/31 |
| 8,384,367 B2 * | 2/2013 | Murakami | H02J 7/0065 | 323/225 |
| 8,482,154 B2 * | 7/2013 | Sato | H02M 1/44 | 307/44 |
| 8,615,341 B2 * | 12/2013 | Kitanaka | B60L 3/003 | 701/22 |
| 2002/0154527 A1 * | 10/2002 | Lin | H02J 7/022 | 363/143 |
| 2002/0186576 A1 * | 12/2002 | Kanouda | H02J 9/061 | 363/125 |
| 2002/0190525 A1 * | 12/2002 | Worden | H02P 9/04 | 290/1 A |
| 2004/0178679 A1 * | 9/2004 | Kabasawa | H02J 9/061 | 307/10.1 |
| 2004/0202012 A1 * | 10/2004 | Ferens | H02M 7/08 | 363/65 |
| 2005/0117376 A1 | 6/2005 | Wilson | | |
| 2006/0227582 A1 * | 10/2006 | Wei | H02M 7/06 | 363/126 |
| 2011/0095727 A1 * | 4/2011 | Yeh | H02J 9/062 | 320/138 |
| 2011/0140527 A1 * | 6/2011 | Choi | H02J 7/35 | 307/76 |
| 2012/0013186 A1 * | 1/2012 | Sarti | G06F 1/30 | 307/23 |
| 2012/0173031 A1 * | 7/2012 | Parameswaran | H02J 7/35 | 700/295 |
| 2012/0232728 A1 | 9/2012 | Karimi et al. | | |
| 2014/0049104 A1 | 2/2014 | Hagihara | | |
| 2014/0153294 A1 * | 6/2014 | Deboy | H02M 3/33569 | 363/21.04 |
| 2014/0180351 A1 * | 6/2014 | Gilman | A61N 1/36542 | 607/4 |
| 2014/0265955 A1 | 9/2014 | Garlow et al. | | |

OTHER PUBLICATIONS

French Preliminary Search Report, dated Mar. 12, 2018, regarding Application No. FR1559115, 5 pages.

* cited by examiner

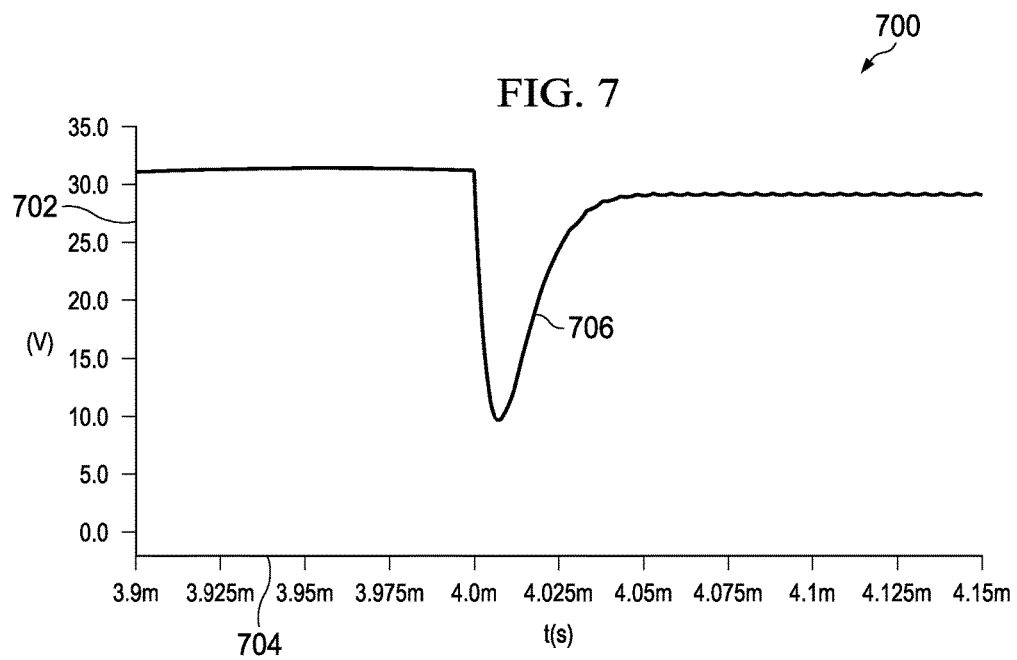
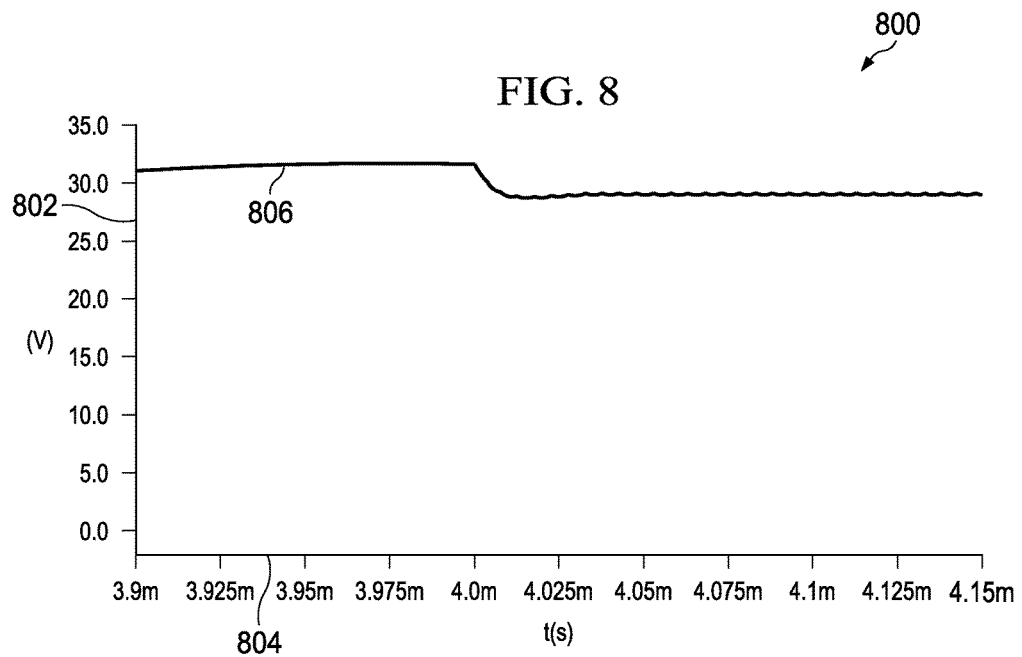

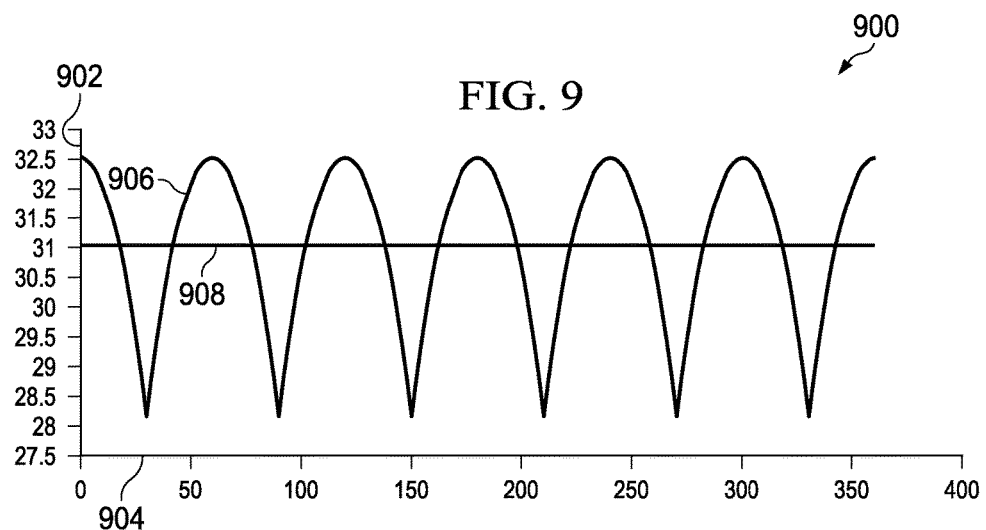
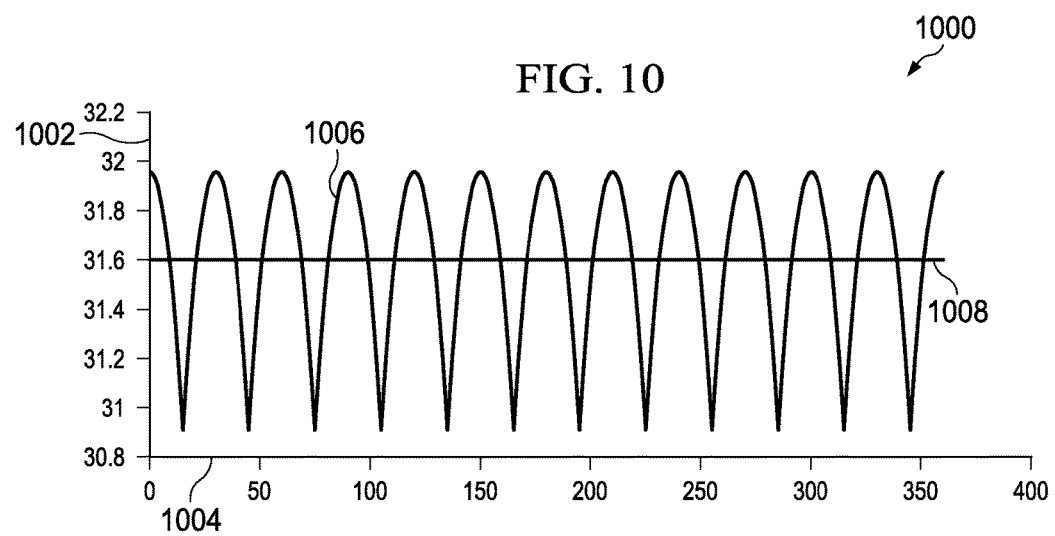

NO-BREAK POWER TRANSFER

BACKGROUND INFORMATION

1. Field

The present disclosure relates generally to electrical power systems and, in particular, to electrical power systems on aircraft. Still more particularly, the present disclosure relates to a method and apparatus for transferring electrical power provided for a load between different electrical power sources and to a transformer rectifier unit for converting alternating current power to direct current power.

2. Background

Various systems and devices on an aircraft may use electrical power. For example, without limitation, electrical power may be used by a flight control system, in-flight entertainment systems, computers, actuators, lights, fans, pumps, or other systems and devices on an aircraft. Some systems and devices on an aircraft may use direct current, DC, power. Other systems and devices on an aircraft may use alternating current, AC, power.

Electrical power for systems and devices on an aircraft may be provided by an electrical power system. An electrical power system on an aircraft may include various sources of electrical power and various structures for delivering electrical power from the electrical power sources to various systems and devices on the aircraft. An electrical power system on an aircraft may include a number of sources of AC power, a number of sources of DC power, or both. For example, without limitation, electrical power may be delivered from various power sources to various systems and devices that use electrical power on an aircraft via a number of buses. For example, AC power may be provided from a number of AC power sources to systems and devices on the aircraft that use AC power via a number of AC buses on the aircraft. DC power may be provided from a number of DC power sources to systems and devices on the aircraft that use DC power via a number of DC buses on the aircraft.

AC power on an aircraft may be provided by a number of generators, by a number of other appropriate AC power sources, or by various combinations of AC power sources. Generators for providing AC power on an aircraft may be driven by the aircraft engines, in another appropriate manner, or in a combination of appropriate manners.

An AC-to-DC converter may be one example of a source of DC power on an aircraft. AC power may be converted to DC power by a number of AC-to-DC converters on an aircraft. For example, without limitation, an AC-to-DC converter may be configured to receive AC power provided on an AC bus on the aircraft by an AC power source and to provide DC power on a DC bus on the aircraft. An AC-to-DC converter on an aircraft may be configured to provide DC power at a desired voltage for use by various systems and devices that use DC power on the aircraft from the AC power provided on the AC bus lines by the AC power source.

A battery may be another example of a source of DC power on an aircraft. A battery on an aircraft may provide DC power at a certain voltage. A DC-to-DC converter on the aircraft may be configured to convert DC power provided by the battery at a first voltage to DC power at a second voltage that is desirable for use by various systems and devices that use DC power on the aircraft. For example, a DC-to-DC converter on an aircraft may be connected to provide DC power at a desired voltage onto a DC bus on the aircraft to distribute the DC power to various systems and devices on the aircraft via the DC bus.

DC power for various systems and devices on an aircraft may be provided on a DC bus on the aircraft by different DC power sources at different times. For example, without limitation, DC power may be provided on a DC bus on an aircraft by an AC-to-DC converter at times when the aircraft engines are operating and the AC-to-DC converter is receiving AC power from a generator driven by an aircraft engine. At other times, DC power may be provided on the DC bus on the aircraft by a DC-to-DC converter receiving DC power from a battery or another source of backup power. Therefore, at various points in time, it may be desirable to change from providing power on a DC bus on an aircraft by an AC-to-DC converter to providing power on the DC bus the aircraft by a DC-to-DC converter, and vice versa.

It may desirable that transferring the providing of power on a DC bus on an aircraft between different DC power sources does not affect the DC power provided to aircraft systems and devices via the DC bus in an undesired way. Currently, transferring the providing of power on a DC bus on an aircraft between different DC power sources may result in an undesired break in the power provided on the DC bus. A method and apparatus for transferring the providing of power on a DC bus between different DC power sources without a break in power on the DC bus may be desirable.

An AC-to-DC converter on an aircraft may be implemented as a transformer rectifier unit. A transformer rectifier unit comprises a transformer and a rectifier. For example, without limitation, a transformer in a transformer rectifier unit on an aircraft may be configured to transform a multiple-phase AC input signal provided by an AC power source to a multiple-phase AC output signal. The transformer may be configured to transform the voltage, phase, other characteristics, or various combinations of characteristics of the multiple-phase AC input signal received by the transformer to provide the multiple-phase AC output signal. The rectifier in the transformer rectifier unit may be configured to convert that multiple-phase AC output signal provided by the transformer in the transformer rectifier unit to a DC power signal.

It may be desirable that the quality of the DC power provided by a transformer rectifier unit on an aircraft is adequate. For example, without limitation, it may be desirable that voltage ripple in the DC power signal provided by a transformer rectifier unit is reduced. It also may be desirable to simplify the design of a transformer rectifier unit on an aircraft.

Therefore, it would be desirable to have a method and apparatus that take into account at least some of the issues discussed above, as well as other possible issues.

SUMMARY

An illustrative embodiment provides an apparatus comprising a DC-to-DC converter, an AC-to-DC converter, and a connector. The DC-to-DC converter comprises a filter circuit and a DC-to-DC converter output. The filter circuit comprises a filter circuit input and a filter circuit output comprising the DC-to-DC converter output. The AC-to-DC converter comprises an AC-to-DC converter output. The connector connects the AC-to-DC converter output to the filter circuit input in the DC-to-DC converter.

An illustrative embodiment also provides a method of transferring power to a load. An AC-to-DC converter output for an AC-to-DC converter is connected to a filter circuit input in a DC-to-DC converter via a connector such that a no-break power transfer occurs when transferring between providing power for the load by the AC-to-DC converter and providing power for the load by the DC-to-DC converter.

An illustrative embodiment also provides an apparatus comprising a number of transformer inputs, a number of sets of windings, and a number of transformer outputs. Each set of windings in the number of sets of windings comprises a primary winding and secondary windings. The primary winding in each set of windings is connected between two of the number of transformer inputs. The secondary windings in each set of windings consists of six secondary windings. The number of transformer outputs comprises four transformer outputs for each set of windings in the number of sets of windings. Each of the four transformer outputs for a set of windings in the number of sets of windings is connected to a number of the secondary windings in the set of windings.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

FIG. 7 is an illustration of a graph of voltage during a prior art power transfer;

FIG. 8 is an illustration of a graph of voltage during a power transfer in accordance with an illustrative embodiment;

FIG. 9 is an illustration of a graph of output voltage provided by a prior art transformer rectifier unit; and FIG. 10 is an illustration of a graph of output voltage provided by a transformer rectifier unit in accordance with an illustrative embodiment.

DETAILED DESCRIPTION

Figure 1:
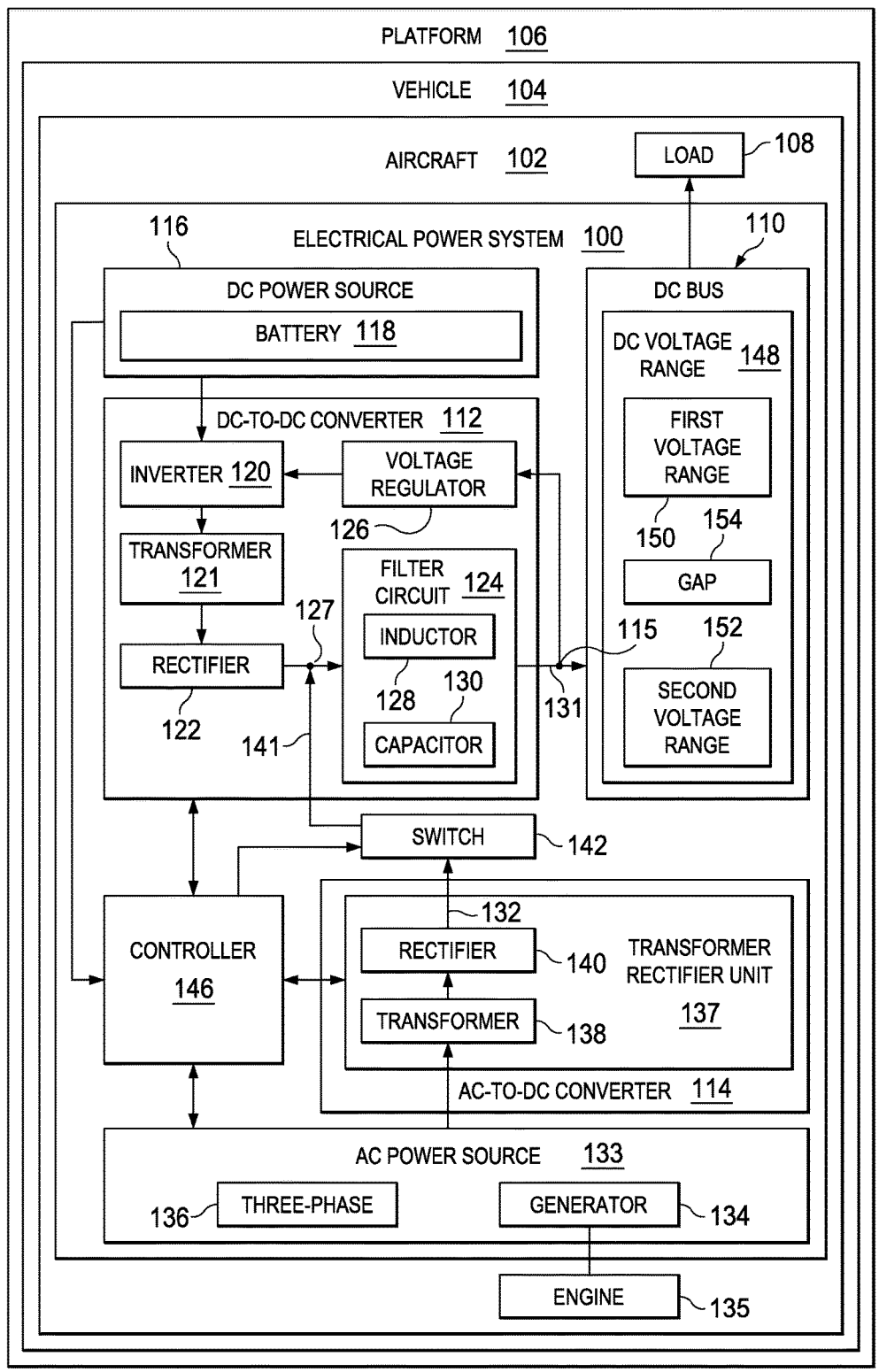
FIG. 1 is an illustration of a block diagram of an electrical power system in accordance with an illustrative embodiment.

Illustrative embodiments recognize and take into account a number of considerations. "A number," as used herein with reference to items, means one or more items. For example, "a number of different considerations" are one or more different considerations.

Illustrative embodiments recognize and take into account that, currently, transferring between different electrical power sources for providing electrical power for a load may result in a break in the electrical power provided for the load by the electrical power sources. For example, currently, an AC-to-DC converter and a DC-to-DC converter may be connected in parallel to a DC bus on an aircraft to provide DC power for a load on the aircraft via the DC bus alternatively by the AC-to-DC converter and the DC-to-DC converter. In this case, for example, transferring from providing power to the DC bus by the AC-to-DC converter to providing power to the DC bus by the DC-to-DC converter may result in a relatively large voltage drop that may exceed power quality limits. An example of such a relatively large voltage drop resulting from such a transfer from providing power by an AC-to-DC converter to providing power by a DC-to-DC converter is illustrated in, and described below with reference to, FIG. 7.

Illustrative embodiments recognize and take into account that a break in the electrical power provided for a load resulting from transferring between different electrical power sources for providing electrical power for the load may affect the load in an undesired way. Currently, systems and devices on an aircraft that receive electrical power via a DC bus on the aircraft may be designed to withstand and operate normally in response to a break in the electrical power provided on the DC bus resulting from transferring between providing power on the DC bus by an AC-to-DC converter and providing power on the DC bus by a DC-to-DC converter. Illustrative embodiments recognize and take into account that systems and devices on an aircraft that are designed to withstand such breaks in electrical power may be more expensive, more complex, heavier, result in greater costs for operating an aircraft, or result in various other undesirable limitations or various combinations of undesirable limitations.

Illustrative embodiments recognize and take into account that no-break power transfers between different sources of electrical power may avoid some or all of the limitations of current systems and methods for transferring between different sources of electrical power. Therefore, illustrative embodiments provide a method and apparatus for no-break power transfers between different sources of electrical power. For example, illustrative embodiments may maintain no-break functionality when transferring between providing power for a load by an AC-to-DC converter and providing power for the load by a DC-to-DC converter. For example, without limitation, illustrative embodiments may provide no-break power transfers by connecting an AC-to-DC converter output to a filter circuit input in a DC-to-DC converter to integrate the AC-to-DC converter and the DC-to-DC converter into a single unit.

Illustrative embodiments recognize and take into account that an AC-to-DC converter used as DC power source may comprise a transformer rectifier unit. Currently, a transformer rectifier unit used as a DC power source in an aircraft or other application may provide an output voltage including a relatively large ripple that may be greater than desired. An example of such a relatively large voltage ripple in the output of a transformer rectifier unit is illustrated in, and described below with reference to, FIG. 9. Illustrative embodiments recognize and take into account that systems and devices on an aircraft that use the power provided by a DC power source may be affected in undesired ways by a greater than desired voltage ripple in the power provided by the DC power source. Illustrative embodiments recognize and take into account that reducing DC voltage ripple in an aircraft power system is, therefore, one of the goals in modern aircraft design.

Illustrative embodiments recognize and take into account that, currently, additional inter-phase transformers or inductors and capacitors may be used in a transformer rectifier unit on an aircraft to reduce transformer rectifier unit output voltage ripple to meet design requirements. Illustrative embodiments recognize and take into account that voltage ripple at the output of a transformer rectifier unit may be reduced by using a transformer in the transformer rectifier unit that is configured to provide a relatively large number of output pulses per cycle and a corresponding rectifier for rectifying the relatively large number of output pulses to provide the output for the transformer rectifier unit. For example, without limitation, a transformer providing 24 output pulses per cycle and a 24-pulse rectifier may be used in a transformer rectifier unit to reduce voltage ripple at the output of the transformer rectifier unit. Currently, such a 24-pulse transformer may require a relatively large number of windings. For example, current 24-pulse transformers may require 24 or 33 transformer windings. Illustrative embodiments recognize and take into account that current solutions for reducing DC voltage ripple in an aircraft power system may require the use of transformer rectifier units that include additional components. Such current solutions may be more expensive, more complex, heavier, result in greater costs for operating an aircraft, or result in various other undesirable limitations or various combinations of undesirable limitations.

Illustrative embodiments provide a transformer rectifier unit that provides relatively low output voltage ripple while avoiding some or all of the limitations of current solutions for reducing voltage ripple at the output of a transformer rectifier unit. Illustrative embodiments provide a transformer for a transformer rectifier unit that reduces voltage ripple at the output of the transformer rectifier unit using fewer transformer windings. For example, without limitation, illustrative embodiments provide a 24-pulse transformer with only 21 windings. A transformer in accordance with an illustrative embodiment may be less complex, easier and cheaper to build and maintain, and have higher reliability than transformers currently used to reduce output voltage ripple in current transformer rectifier units.

Illustrative embodiments also recognize and take into account that the voltage on a DC bus on an aircraft may be required to be within an allowed voltage range. For example, the allowed voltage range may be a range of voltage on the DC bus at which systems and devices on the aircraft that receive power from the DC bus may operate properly. Currently, the voltage ripple on the output of a transformer rectifier unit providing power to a DC bus on an aircraft may be so large that the voltage provided on the DC bus by the transformer rectifier unit may vary across all or most of the allowed voltage range for the DC bus when the nominal DC output voltage for the transformer rectifier unit is set at the center of the allowed voltage range.

The voltage ripple on the output of a transformer rectifier unit in accordance with an illustrative embodiment may be sufficiently small such that the transformer rectifier unit may be configured to provide power on the DC bus that is contained within a smaller first voltage range in the allowed voltage range. A DC-to-DC converter may be configured to provide power on the DC bus that is contained within a separate second voltage range in the allowed voltage range. In this case, the source of DC power provided on the DC bus at a particular time may be determined relatively easily by identifying the voltage on the DC bus at the time and determining whether the identified voltage on the DC bus is in the first voltage range or the second voltage range.

Turning to FIG. 1, an illustration of a block diagram of an electrical power system is depicted in accordance with an illustrative embodiment. For example, without limitation, electrical power system 100 may provide electrical power for aircraft 102.

Aircraft 102 may be a commercial passenger aircraft, a cargo aircraft, a private or personal aviation aircraft, a military aircraft, or any other appropriate type of aircraft that may be used for any appropriate purpose. Aircraft 102 may be a fixed wing, rotary wing, or lighter-than-air aircraft. Aircraft 102 may comprise a manned aircraft or an unmanned aerial vehicle.

Aircraft 102 is an example of vehicle 104. Illustrative embodiments may include electrical power system 100 for providing electrical power on vehicle 104 other than aircraft 102. Vehicle 104 may comprise any vehicle configured for operation in the air, in space, on land, on water, under water, or in any other medium or combinations of media.

Vehicle 104 is an example of platform 106. Illustrative embodiments may include electrical power system 100 for providing electrical power on platform 106 other than vehicle 104. For example, without limitation, platform 106 may be a building, an oil rig, or any other appropriate mobile or fixed platform.

Electrical power system 100 provides direct current, DC, power for load 108. Load 108 may comprise a number of loads on aircraft 102, vehicle 104, or platform 106. Load 108 may include any system or device that is configured to use DC power. For example, without limitation, load 108 on aircraft 102 may include instruments, controls, motors, other systems or devices, or various combinations of systems and devices on aircraft 102 that use DC power.

Electrical power system 100 may be configured to provide DC power for load 108 via DC bus 110. DC bus 110 may comprise any appropriate structure for providing DC power from a source of DC power to load 108. For example, without limitation, DC bus 110 may comprise appropriate wires connecting a source of DC power to load 108 for carrying a DC electrical power signal from the source of DC power to load 108. DC bus 110 may be considered to be a part of load 108 for which DC power is provided by a source of DC power.

Electrical power system 100 is configured to provide DC power for load 108 by DC-to-DC converter 112 and AC-to-DC converter 114. DC-to-DC converter 112 and AC-to-DC converter 114 are examples of sources of DC power for load 108.

DC-to-DC converter 112 is configured to provide DC power for load 108 on DC-to-DC converter output 115 from DC power provided by DC power source 116. DC-to-DC converter output 115 may be connected to DC bus 110 in an appropriate manner to provide DC power from DC-to-DC converter 112 to load 108.

DC power source 116 may comprise any appropriate source of DC power. For example, without limitation, DC power source 116 may comprise battery 118. Alternatively, or in addition, DC power source 116 may comprise a DC bus other than DC bus 110, a DC-to-DC converter other than DC-to-DC converter 112, an AC-to-DC converter other than AC-to-DC converter 114, any other appropriate source of DC power, or various appropriate combinations of sources of DC power.

DC-to-DC converter 112 may be configured to convert DC power provided by DC power source 116 at one voltage to DC power at another voltage that is appropriate for load 108. For example, without limitation, DC-to-DC converter 112 may be configured to convert DC power provided by DC power source 116 at a relatively high voltage to DC power for load 108 at a relatively lower voltage. Alternatively, or in addition, DC-to-DC converter 112 may be configured to convert DC power provided by DC power source 116 at a relatively low voltage to DC power for load 108 at a relatively higher voltage. Alternatively, or in addition, DC-to-DC converter 112 may be configured to change a number of other characteristics of DC power provided by DC power source 116 to provide DC power comprising a number of characteristics that may be appropriate for load 108.

DC-to-DC converter 112 may be implemented in any appropriate manner. For example, without limitation, DC-to-DC converter 112 may be implemented as a switched-mode converter comprising inverter 120, transformer 121, rectifier 122, filter circuit 124, and voltage regulator 126. Inverter 120 may convert DC from DC power source 116 to AC using an appropriate switching circuit. The AC produced by inverter 120 drives the primary winding of transformer 121. Transformer 121 may be configured to convert voltage up or down to the required output level on the secondary winding of transformer 121. Rectifier 122 may be configured to convert the AC on the secondary winding of transformer 121 to DC using an appropriate diode circuit or in any other appropriate manner.

The output of rectifier 122 is provided to filter circuit 124 at filter circuit input 127. Filter circuit 124 is configured to smooth the output of rectifier 122. Filter circuit 124 may comprise inductor 128 and capacitor 130. Smoothed DC power is provided from filter circuit 124 on filter circuit output 131. Filter circuit output 131 also may comprise DC-to-DC converter output 115 for DC-to-DC converter 112.

Voltage regulator 126 may comprise a feedback circuit that is configured to monitor the output voltage from DC-to-DC converter 112 and to compare the output voltage from DC-to-DC converter 112 with a desired output voltage for DC-to-DC converter 112. Voltage regulator 126 may be configured to control switching devices in inverter 120 in an appropriate manner to drive the monitored output voltage from DC-to-DC converter 112 to match the desired output voltage for DC-to-DC converter 112.

AC-to-DC converter 114 is configured to provide DC power for load 108 on AC-to-DC converter output 132 from AC power provided by AC power source 133. AC power source 133 may comprise any appropriate source of AC power. For example, without limitation, AC power source 133 may comprise generator 134. For example, without limitation, generator 134 on aircraft 102 may be driven by engine 135 of aircraft 102.

AC power source 133 may provide single-phase or multiple-phase AC power. For example, without limitation, AC power source 133 may provide three-phase 136 AC power. Alternatively, AC power source 133 may provide multiple-phase AC power having fewer or more than three phases.

AC-to-DC converter 114 may be implemented in any appropriate manner. Preferably, AC-to-DC converter 114 is configured to provide DC power having relatively low voltage ripple on AC-to-DC converter output 132. For example, without limitation, AC-to-DC converter 114 may be implemented as transformer rectifier unit 137 comprising transformer 138 and rectifier 140.

In this case, AC power from AC power source 133 may be provided to the input of transformer 138. Transformer 138 may be configured to convert the AC power provided by AC power source 133 at one voltage to AC power at another voltage on the output of transformer 138. For example, without limitation, transformer 138 may be configured to convert AC power provided by AC power source 133 at a relatively high voltage to AC power at a relatively lower voltage. Alternatively, or in addition, transformer 138 may be configured to convert AC power provided by AC power source 133 at a relatively low voltage to AC power at a relatively higher voltage. Alternatively, or in addition, transformer 138 may be configured to change a number of other characteristics of the AC power provided by AC power source 133. For example, without limitation, transformer 138 may be configured to convert AC power having a number of phases as provided by AC power source 133 to AC power having a different number of phases at the output of transformer 138.

The output of transformer 138 is provided to rectifier 140. Rectifier 140 may be configured to convert the AC on the output of transformer 138 to DC using an appropriate diode circuit or in any other appropriate manner. DC power from rectifier 140 may be provided as the output of AC-to-DC converter 114 on AC-to-DC converter output 132.

In accordance with an illustrative embodiment, AC-to-DC converter output 132 is connected by connector 141 to filter circuit input 127 in DC-to-DC converter 112. Connector 141 may comprise any appropriate structure for connecting the DC power provided by AC-to-DC converter 114 at AC-to-DC converter output 132 to filter circuit input 127 in DC-to-DC converter 112. For example, without limitation, connector 141 may comprise an appropriate wire.

Connector 141 may or may not include switch 142. Switch 142 may be implemented in any appropriate manner alternatively to connect and disconnect AC-to-DC converter output 132 to filter circuit input 127 in DC-to-DC converter 112 via connector 141. For example, without limitation, switch 142 may include an appropriate electronic, mechanical, or electro-mechanical switching device.

The operation of one or more components of electrical power system 100 may be controlled by controller 146. For example, controller 146 may be implemented in any appropriate manner to control DC-to-DC converter 112, AC-to-DC converter 114, AC power source 133, switch 142, other components of electrical power system 100, or various combinations of components of electrical power system 100 in any appropriate manner. For example, without limitation, controller 146 may be configured to control a number of components of electrical power system 100 to transfer from providing power for load 108 by AC-to-DC converter 114 to providing power for load 108 by DC-to-DC converter 112, and vice versa.

By connecting AC-to-DC converter output 132 to filter circuit input 127 in DC-to-DC converter 112, a no-break power transfer occurs when transferring between providing power for load 108 by AC-to-DC converter 114 and providing power for load 108 by DC-to-DC converter 112. A no-break power transfer may be defined as a transfer between providing power for load 108 by AC-to-DC converter 114 and providing power for load 108 by DC-to-DC converter 112 that does not cause the voltage on DC bus 110 to fall out of DC voltage range 148. DC voltage range 148 may be a desired or allowed range of voltage for the DC power provided for load 108 on DC bus 110. For example, DC voltage range 148 may be defined based on the range of voltage on DC bus 110 at which load 108 that receives power from DC bus 110 may operate properly. For example, without limitation, DC voltage range 148 on DC bus 110 for aircraft 102 may be approximately 28 volts to approximately 32 volts, or any other appropriate range of voltage.

DC voltage range 148 may comprise first voltage range 150 and second voltage range 152. Preferably, first voltage range 150 and second voltage range 152 are within DC voltage range 148 and do not overlap each other. In other words, first voltage range 150 and second voltage range 152 are preferably separated by gap 154 within DC voltage range 148. For example, without limitation, first voltage range 150 on DC bus 110 for aircraft 102 may be approximately 30.5 volts to approximately 32 volts, or any other appropriate range of voltage. Second voltage range 152 on DC bus 110 for aircraft 102 may be approximately 28 volts to approximately 29.5 volts, or any other appropriate range of voltage.

In accordance with an illustrative embodiment, AC-to-DC converter 114 may be configured to provide power on DC bus 110 within first voltage range 150 in DC voltage range 148. DC-to-DC converter 112 may be configured to provide power on DC bus 110 within second voltage range 152 in DC voltage range 148. In this case, the source of DC power provided on DC bus 110 at a particular time may be determined relatively easily by identifying the voltage on DC bus 110 at the time and determining whether the identified voltage on DC bus 110 is in first voltage range 150 or second voltage range 152.

Figure 2:
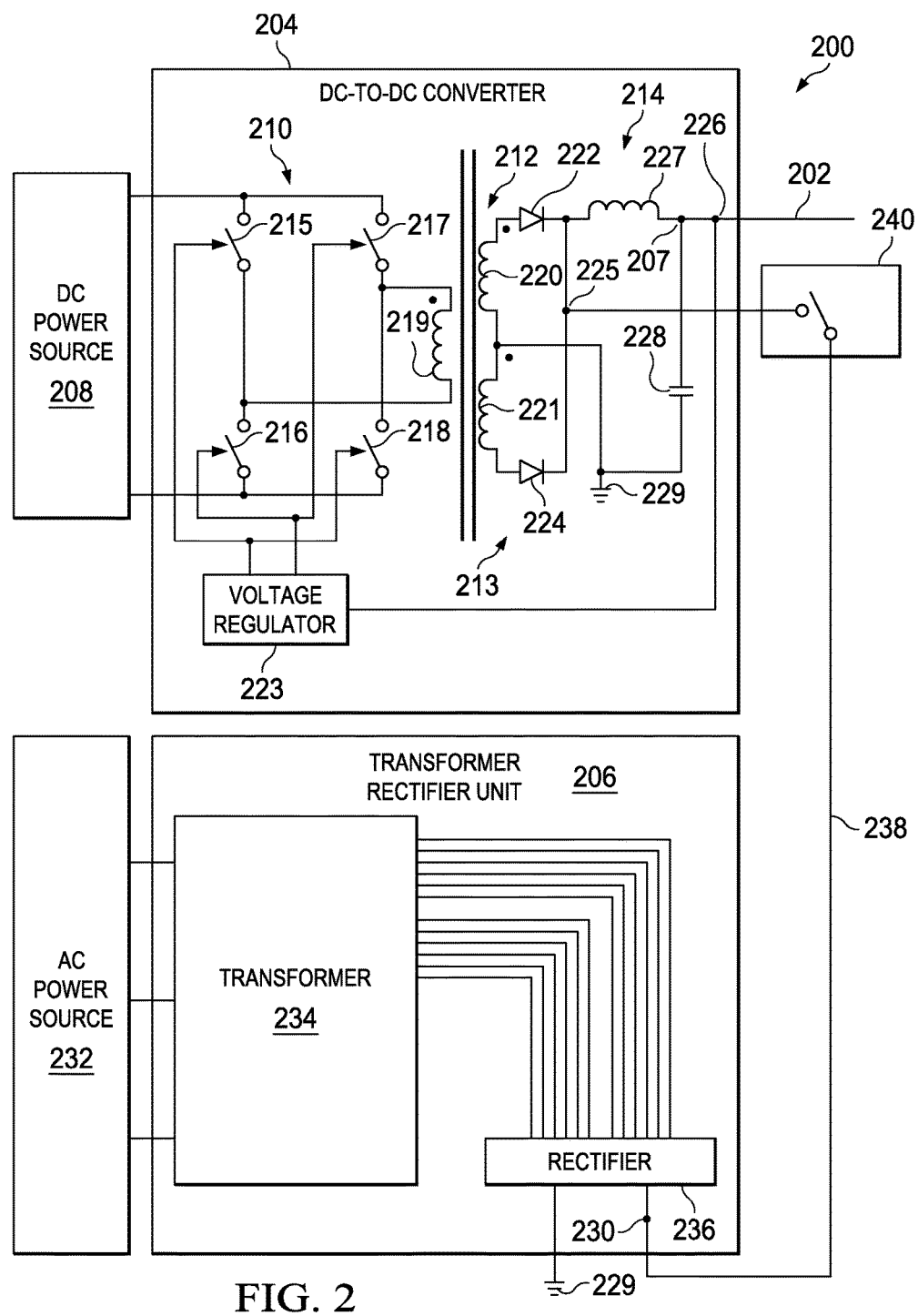
FIG. 2 is an illustration of a circuit diagram of an electrical power system in accordance with an illustrative embodiment.

Turning to FIG. 2, an illustration of a circuit diagram of an electrical power system is depicted in accordance with an illustrative embodiment. Electrical power system 200 may be an example of one implementation of electrical power system 100 in FIG. 1.

Electrical power system 200 is configured to provide DC power for a load on DC bus 202. Electrical power system 200 is configured to provide DC power on DC bus 202 alternatively by DC-to-DC converter 204 and transformer rectifier unit 206.

DC-to-DC converter 204 is configured to provide DC power on DC-to-DC converter output 207 from DC power provided by DC power source 208. DC-to-DC converter 204 may be configured in any appropriate manner to convert DC power provided by DC power source 208 at one voltage to DC power at another voltage on DC-to-DC converter output 207. DC-to-DC converter output 207 may be connected to DC bus 202 in an appropriate manner to provide DC power from DC-to-DC converter 204 on DC bus 202.

DC-to-DC converter 204 may be implemented as a switched-mode converter comprising inverter 210, transformer 212, rectifier 213, filter circuit 214, and voltage regulator 223. Inverter 210 may be configured to convert DC from DC power source 208 to AC using switching devices 215, 216, 217, and 218 arranged in an appropriate bridge configuration. For example, without limitation, switching devices 215, 216, 217, and 218 may comprise appropriate transistors or other solid state or other appropriate switching devices. The AC produced by inverter 210 drives primary winding 219 of transformer 212. The number of turns and arrangement of primary winding 219 and secondary windings 220 and 221 of transformer 212 may be selected to provide a desired output voltage on secondary windings 220 and 221 of transformer 212 for a given input voltage provided on primary winding 219 of transformer 212. Rectifier 213 may be configured to convert the AC on secondary windings 220 and 221 of transformer 212 to DC using diodes 222 and 224.

The output of rectifier 213 is provided to filter circuit 214 at filter circuit input 225. Filter circuit 214 is configured to provide smoothed DC power on filter circuit output 226. Filter circuit output 226 also may comprise DC-to-DC converter output 207 for DC-to-DC converter 204. In this example, filter circuit comprises inductor 227 and capacitor 228. Inductor 227 is connected in series between filter circuit input 225 and filter circuit output 226. Capacitor 228 is connected between filter circuit output 226 and ground 229. Inductor 227 and capacitor 228 may be selected as appropriate to smooth the output of rectifier 213 as desired.

Voltage regulator 223 may comprise a feedback circuit that is configured to monitor the output voltage from DC-to-DC converter 204 at DC-to-DC converter output 207 and to compare the output voltage from DC-to-DC converter 204 at DC-to-DC converter output 207 with a desired output voltage for DC-to-DC converter 204. Voltage regulator 223 may be configured to control switching devices 215, 216, 217, and 218 in inverter 210 in an appropriate manner to drive the monitored output voltage from DC-to-DC converter 204 at DC-to-DC converter output 207 to match the desired output voltage for DC-to-DC converter 204.

Transformer rectifier unit 206 is configured to provide DC power on AC-to-DC converter output 230 from AC power provided by AC power source 232. Transformer rectifier unit 206 may be implemented in any appropriate manner. Preferably, transformer rectifier unit 206 is configured to provide DC power having relatively low voltage ripple on AC-to-DC converter output 230.

Transformer rectifier unit 206 comprises transformer 234 and rectifier 236. In this example, without limitation, three-phase AC power from AC power source 232 may be provided to the input of transformer 234. Transformer 234 may be configured to convert the three-phase AC power provided by AC power source 232 to 12-phase AC power at a desired voltage on the output of transformer 234. Each of the 12 AC signals provided on the output of transformer 234 comprises alternating positive and negative pulses. Therefore, transformer 234 may be referred to as a 24-pulse transformer.

The 12-phase AC output of transformer 234 is provided to rectifier 236. In this example, rectifier 236 comprises a 24-pulse rectifier that is configured to convert the 24-pulse output from transformer 234 to DC power on AC-to-DC converter output 230.

AC-to-DC converter output 230 is connected by connector 238 to filter circuit input 225 in DC-to-DC converter 204. By connecting AC-to-DC converter output 230 to filter circuit input 225 in DC-to-DC converter 204, a no-break power transfer occurs when transferring between providing power on DC bus 202 by transformer rectifier unit 206 and providing power on DC bus 202 by DC-to-DC converter 204. Connector 238 may include switch 240. Switch 240 may be implemented in any appropriate manner alternatively to connect and disconnect AC-to-DC converter output 230 to filter circuit input 225 in DC-to-DC converter 204.

The illustrations of FIG. 1 and FIG. 2 are not meant to imply physical or architectural limitations to the manner in which illustrative embodiments may be implemented. Other components in addition to or in place of the ones illustrated may be used. Some components may be optional. Also, blocks are presented in the figures to illustrate some functional components. One or more of these blocks may be combined, divided, or combined and divided into different blocks when implemented in an illustrative embodiment.

Figure 3:
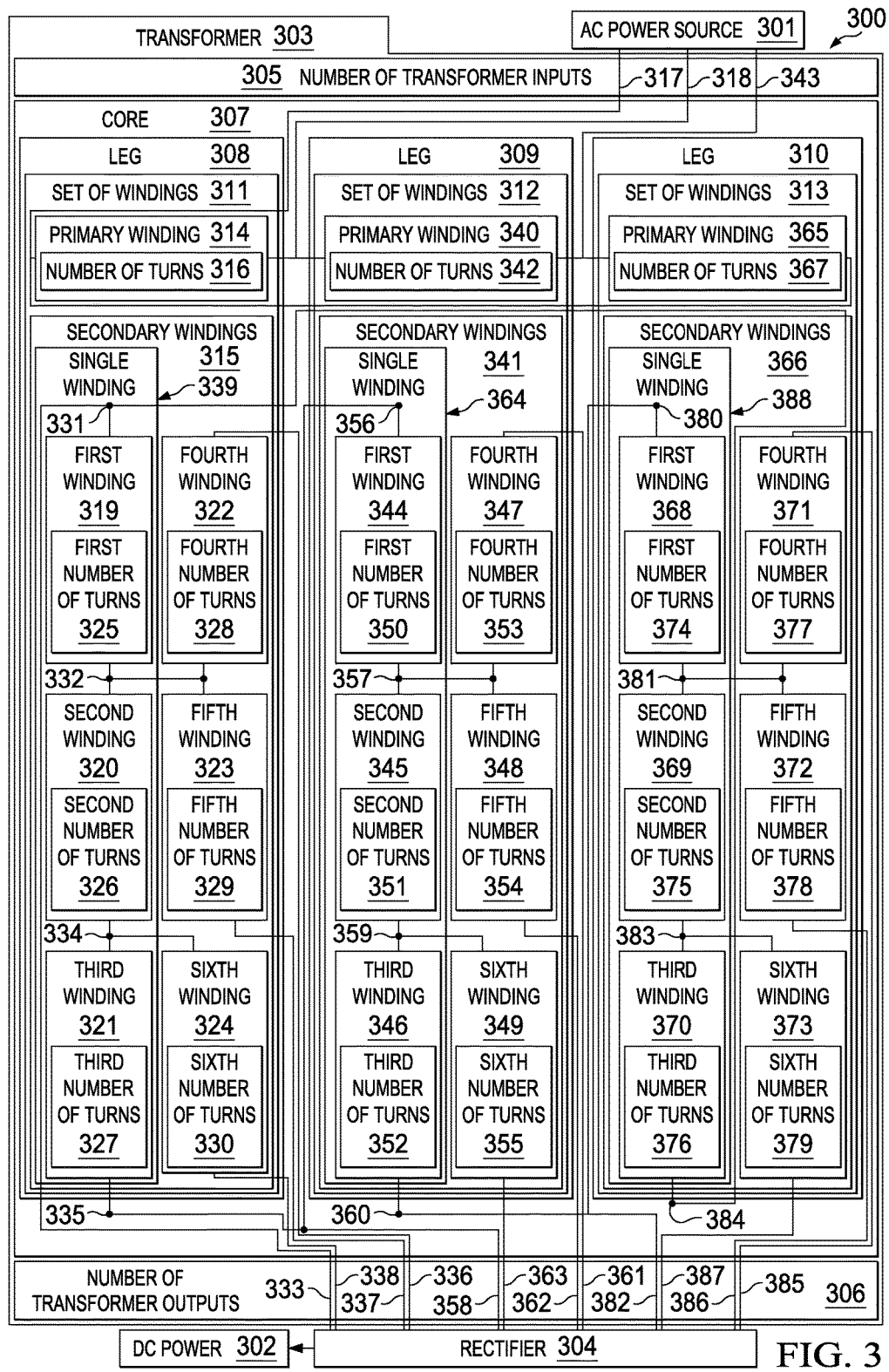
FIG. 3 is an illustration of a block diagram of a transformer rectifier unit in accordance with an illustrative embodiment.

Turning to FIG. 3, an illustration of a block diagram of a transformer rectifier unit is depicted in accordance with an illustrative embodiment. Transformer rectifier unit 300 may be an example of one implementation of transformer rectifier unit 137 in FIG. 1 and transformer rectifier unit 206 in FIG. 2. Transformer rectifier unit 300 is configured to convert AC power provided by AC power source 301 to DC power 302.

Transformer rectifier unit 300 comprises transformer 303 and rectifier 304. In this example, transformer 303 is configured to receive three-phase AC power from AC power source 301 on number of transformer inputs 305. Transformer 303 is configured to convert the three-phase AC power on number of transformer inputs 305 to 12-phase AC power on number of transformer outputs 306. Each of the 12 AC signals provided on number of transformer outputs 306 comprises alternating positive and negative pulses. Therefore, transformer 303 may be referred to as a 24-pulse transformer. In this case, rectifier 304 comprises a 24-pulse rectifier that is configured to convert the 24-pulse output provided on number of transformer outputs 306 to DC power 302. Transformer rectifier unit 300 may provide DC power 302 with less voltage ripple than may be provided by transformer rectifier units that provide DC power using fewer than 24-pulses.

Transformer 303 comprises core 307. Core 307 may be comprised of one or more different types of appropriate materials. For example, without limitation, core 307 may be comprised of steel, iron, a metal alloy, some other type of metal, or a combination thereof.

In this example, core 307 comprises legs 308, 309, and 310. Each of legs 308, 309, and 310 may comprise an elongated portion of core 307. In this case, legs 308, 309, and 310 may be unitary with core 307. As used herein, a first item that is "unitary" with a second item may be considered part of the second item.

Transformer 303 also includes a number of sets of windings. In this example, windings in set of windings 311 are wound around leg 308 of core 307. Windings in set of windings 312 are wound around leg 309 of core 307. Windings in set of windings 313 are wound around leg 310 of core 307.

Each of the windings in sets of windings 311, 312, and 313 may comprise a number of turns of a conductive material. For example, without limitation, each of the windings in sets of windings 311, 312, and 313 may comprise a coil of conductive wire comprising aluminum, copper, a metal alloy, some other conductive material, or a combination of conductive materials.

In this example, each set of windings 311, 312, and 313 may comprise seven windings. Therefore, in this example, transformer 303 is implemented using a total of 21 windings. Transformer 303 provides a 24-pulse transformer that may be less complex, easier and cheaper to build and maintain, and have higher reliability than 24-pulse transformers that may be implemented using more than 21 windings.

Set of windings 311 comprises primary winding 314 and secondary windings 315. Primary winding 314 in set of windings 311 comprises number of turns 316. Primary winding 314 may be connected between transformer input 317 in number of transformer inputs 305 and transformer input 318 in number of transformer inputs 305.

Secondary windings 315 in set of windings 311 comprises first winding 319, second winding 320, third winding 321, fourth winding 322, fifth winding 323, and sixth winding 324. First winding 319 comprises first number of turns 325. Second winding 320 comprises second number of turns 326. Third winding 321 comprises third number of turns 327. Fourth winding 322 comprises fourth number of turns 328. Fifth winding 323 comprises fifth number of turns 329. Sixth winding 324 comprises sixth number of turns 330.

First winding 319 is connected between first point 331 and second point 332. Transformer output 333 in number of transformer outputs 306 is connected to first point 331. Second winding 320 is connected between second point 332 and third point 334. Third winding 321 is connected between third point 334 and fourth point 335. Fourth winding 322 is connected between second point 332 and transformer output 336 in number of transformer outputs 306. Fifth winding 323 is connected between second point 332 and transformer output 337 in number of transformer outputs 306. Sixth winding 324 is connected between third point 334 and transformer output 338 in number of transformer outputs 306.

First winding 319, second winding 320, and third winding 321 may comprise single winding 339. In other words, single winding 339 wrapped around leg 308 may be used to function as first winding 319, second winding 320, and third winding 321. In this case, second point 332 may comprise a first tap point on single winding 339 and third point 334 may comprise a second tap point on single winding 339.

Set of windings 312 comprises primary winding 340 and secondary windings 341. Primary winding 340 in set of windings 312 comprises number of turns 342. Primary winding 340 may be connected between transformer input 318 in number of transformer inputs 305 and transformer input 343 in number of transformer inputs 305.

Secondary windings 341 in set of windings 312 comprises first winding 344, second winding 345, third winding 346, fourth winding 347, fifth winding 348, and sixth winding 349. First winding 344 comprises first number of turns 350. Second winding 345 comprises second number of turns 351. Third winding 346 comprises third number of turns 352. Fourth winding 347 comprises fourth number of turns 353. Fifth winding 348 comprises fifth number of turns 354. Sixth winding 349 comprises sixth number of turns 355.

First winding 344 is connected between first point 356 and second point 357. Transformer output 358 in number of transformer outputs 306 is connected to first point 356. First point 356 is also connected to fourth point 335 in secondary windings 315 in set of windings 311. Second winding 345 is connected between second point 357 and third point 359. Third winding 346 is connected between third point 359 and fourth point 360. Fourth winding 347 is connected between second point 357 and transformer output 361 in number of transformer outputs 306. Fifth winding 348 is connected between second point 357 and transformer output 362 in number of transformer outputs 306. Sixth winding 349 is connected between third point 359 and transformer output 363 in number of transformer outputs 306.

First winding 344, second winding 345, and third winding 346 may comprise single winding 364. In other words, single winding 364 wrapped around leg 309 may be used to function as first winding 344, second winding 345, and third winding 346. In this case, second point 357 may comprise a first tap point on single winding 364 and third point 359 may comprise a second tap point on single winding 364.

Set of windings 313 comprises primary winding 365 and secondary windings 366. Primary winding 365 in set of windings 313 comprises number of turns 367. Primary winding 365 may be connected between transformer input 343 in number of transformer inputs 305 and transformer input 317 in number of transformer inputs 305.

Secondary windings 366 in set of windings 313 comprises first winding 368, second winding 369, third winding 370, fourth winding 371, fifth winding 372, and sixth winding 373. First winding 368 comprises first number of turns 374. Second winding 369 comprises second number of turns 375. Third winding 370 comprises third number of turns 376. Fourth winding 371 comprises fourth number of turns 377. Fifth winding 372 comprises fifth number of turns 378. Sixth winding 373 comprises sixth number of turns 379.

First winding 368 is connected between first point 380 and second point 381. Transformer output 382 in number of transformer outputs 306 is connected to first point 380. First point 380 is also connected to fourth point 360 in secondary windings 341 in set of windings 312. Second winding 369 is connected between second point 381 and third point 383. Third winding 370 is connected between third point 383 and fourth point 384. Fourth point 384 is also connected to first point 331 in secondary windings 315 in set of windings 311. Fourth winding 371 is connected between second point 381 and transformer output 385 in number of transformer outputs 306. Fifth winding 372 is connected between second point 381 and transformer output 386 in number of transformer outputs 306. Sixth winding 373 is connected between third point 383 and transformer output 387 in number of transformer outputs 306.

First winding 368, second winding 369, and third winding 370 may comprise single winding 388. In other words, single winding 388 wrapped around leg 310 may be used to function as first winding 368, second winding 369, and third winding 370. In this case, second point 381 may comprise a first tap point on single winding 388 and third point 383 may comprise a second tap point on single winding 388.

Each of primary windings 314, 340, and 365 may comprise the same number of turns Np. Each of first winding 319, second winding 320, and third winding 321 in secondary windings 315, first winding 344, second winding 345, and third winding 346 in secondary windings 341, and first winding 368, second winding 369, and third winding 370 in secondary windings 366 may comprise the same number of turns n1. Each of fourth winding 322 and sixth winding 324 in secondary windings 315, fourth winding 347 and sixth winding 349 in secondary windings 341, and fourth winding 371 and sixth winding 373 in secondary windings 366 may comprise the same number of turns n2. Each of fifth winding 323 in secondary windings 315, fifth winding 348 in secondary windings 341, and fifth winding 372 in secondary windings 366 may comprise the same number of turns n3.

Ratios between the number of turns Np in primary windings 314, 340, and 365 and the number of turns n1, n2, and n3 in secondary windings 315, 341, and 366 may be selected based on the desired voltage magnitude of DC power 302 provided by transformer rectifier unit 300 for the voltage magnitude of the AC power provided to transformer rectifier unit 300 by AC power source 301. Ratios between the number of turns n1, n2, and n3 in secondary windings 315, 341, and 366 may be selected such that, when the phases of the AC input signals at number of transformer inputs 305 are separated by approximately 120 degrees, the phases of the AC output signals at number of transformer outputs 306 are separated from each other by approximately 30 degrees. For example, without limitation, the ratio of n1 to n2 may be approximately 1:0.772 or any other appropriate ratio and the ratio of n1 to n3 may be approximately 1:1.033 or another appropriate ratio.

Expressed in another way, when the phases of the AC input signals at number of transformer inputs 305 are separated by approximately 120 degrees, the phase of the AC output signal at each one of number of transformer outputs 306 preferably leads the phase of a first other one of the AC output signals at a first other one of number of transformer outputs 306 by approximately 30 degrees and lags the phase of a second other one of the AC output signals at a second other one of number of transformer outputs 306 by approximately 30 degrees. As another example, the phases of the AC input signals at number of transformer inputs 305 may be separated by approximately 110 degrees to 130 degrees and the phases of the AC output signals at number of transformer outputs 306 may be separated from each other by approximately 25 degrees to approximately 35 degrees. As a further example, the phases of the AC input signals at number of transformer inputs 305 may be separated by approximately 100 degrees to 140 degrees and the phases of the AC output signals at number of transformer outputs 306 may be separated from each other by approximately 20 degrees to approximately 40 degrees.

Figure 4:
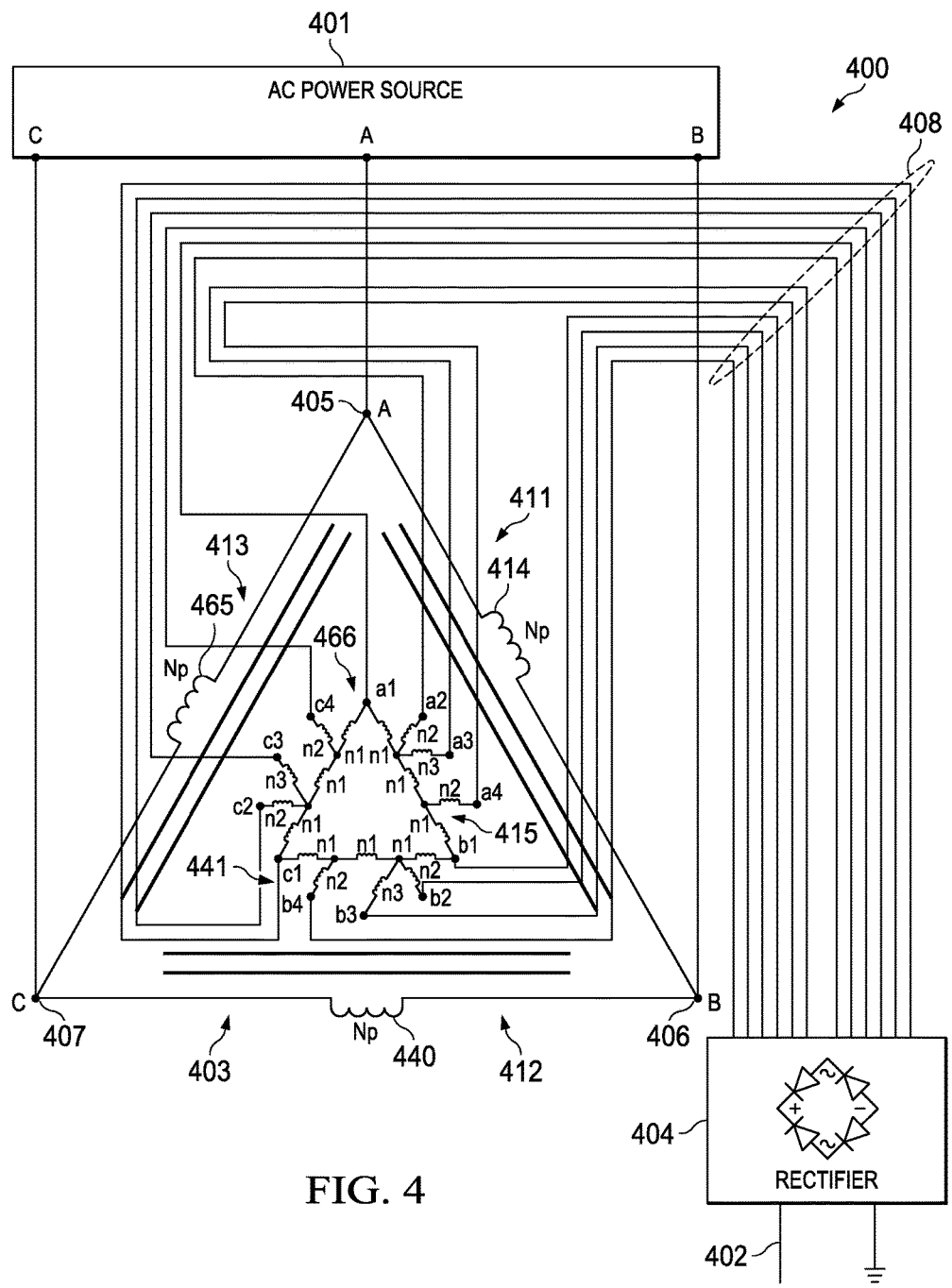
FIG. 4 is an illustration of a circuit diagram of a transformer rectifier unit in accordance with an illustrative embodiment.

Turning to FIG. 4, an illustration of a circuit diagram of a transformer rectifier unit is depicted in accordance with an illustrative embodiment. Transformer rectifier unit 400 may be an example of one implementation of transformer rectifier unit 300 in FIG. 3. Transformer rectifier unit 400 is configured to convert AC power provided by AC power source 401 to DC power on AC-to-DC converter output 402.

Transformer rectifier unit 400 comprises transformer 403 and rectifier 404. In this example, transformer 403 is configured to receive three-phase AC power from AC power source 401 on transformer inputs 405, 406, and 407. Transformer 403 is configured to convert the three-phase AC power on transformer inputs 405, 406, and 407 to 12-phase AC power on number of transformer output lines 408. Each of the 12 AC signals provided on number of transformer output lines 408 comprises alternating positive and negative pulses. Therefore, transformer 403 may be referred to as a 24-pulse transformer. In this case, rectifier 404 comprises a 24-pulse rectifier that is configured to convert the 24-pulse output provided on number of transformer output lines 408 to DC power on AC-to-DC converter output 402. Transformer rectifier unit 400 may provide DC power with less voltage ripple than may be provided by transformer rectifier units that provide DC power using fewer than 24-pulses.

Transformer 403 includes three sets of windings 411, 412, and 413. Each set of windings 411, 412, and 413 may be wound around a separate leg of the core of transformer 403. Sets of windings 411, 412, and 413 may correspond, for example, to sets of windings 311, 312, and 313, respectively, in FIG. 3.

In this example, each set of windings 411, 412, and 413 may comprise seven windings. Therefore, in this example, transformer 403 is implemented using a total of 21 windings. Transformer 403 provides a 24-pulse transformer that may be less complex, easier and cheaper to build and maintain, and have higher reliability than 24-pulse transformers that may be implemented using more than 21 windings.

Set of windings 411 comprises primary winding 414 and six secondary windings 415. Set of windings 412 comprises primary winding 440 and six secondary windings 441. Set of windings 413 comprises primary winding 465 and six secondary windings 466.

Primary windings 414, 440, and 465 may correspond, for example, to primary windings 314, 340, and 365, respectively, in FIG. 3. Primary winding 414 may be connected between transformer input 405 and transformer input 406. Primary winding 440 may be connected between transformer input 406 and transformer input 407. Primary winding 465 may be connected between transformer input 407 and transformer input 405. Primary windings 414, 440, and 465 may be arranged in a delta configuration. Primary windings 414, 440, and 465 each may comprise Np turns.

Secondary windings 415, 441, and 466 may correspond, for example, to secondary windings 315, 341, and 366, respectively, in FIG. 3. Secondary windings 415, 441, and 466 also may be arranged in a delta configuration. Each winding in secondary windings 415, 441, and 466 may comprise n1, n2, or n3 turns, depending on the connections of the winding to other windings and to transformer output lines 408, as shown.

Ratios between the number of turns Np in primary windings 414, 440, and 465 and the number of turns n1, n2, and n3 in secondary windings 415, 441, and 466 may be selected based on the desired voltage magnitude of DC power provided by transformer rectifier unit 400 on AC-to-DC converter output 402 for the voltage magnitude of the AC power provided to transformer rectifier unit 400 by AC power source 401. Ratios between the number of turns n1, n2, and n3 in secondary windings 415, 441, and 466 may be selected such that, when the phases of the AC input signals at transformer inputs 405, 406, and 407 are separated by approximately 120 degrees, the phases of the AC output signals on transformer output lines 408 are separated from each other by approximately 30 degrees.

Figure 5:
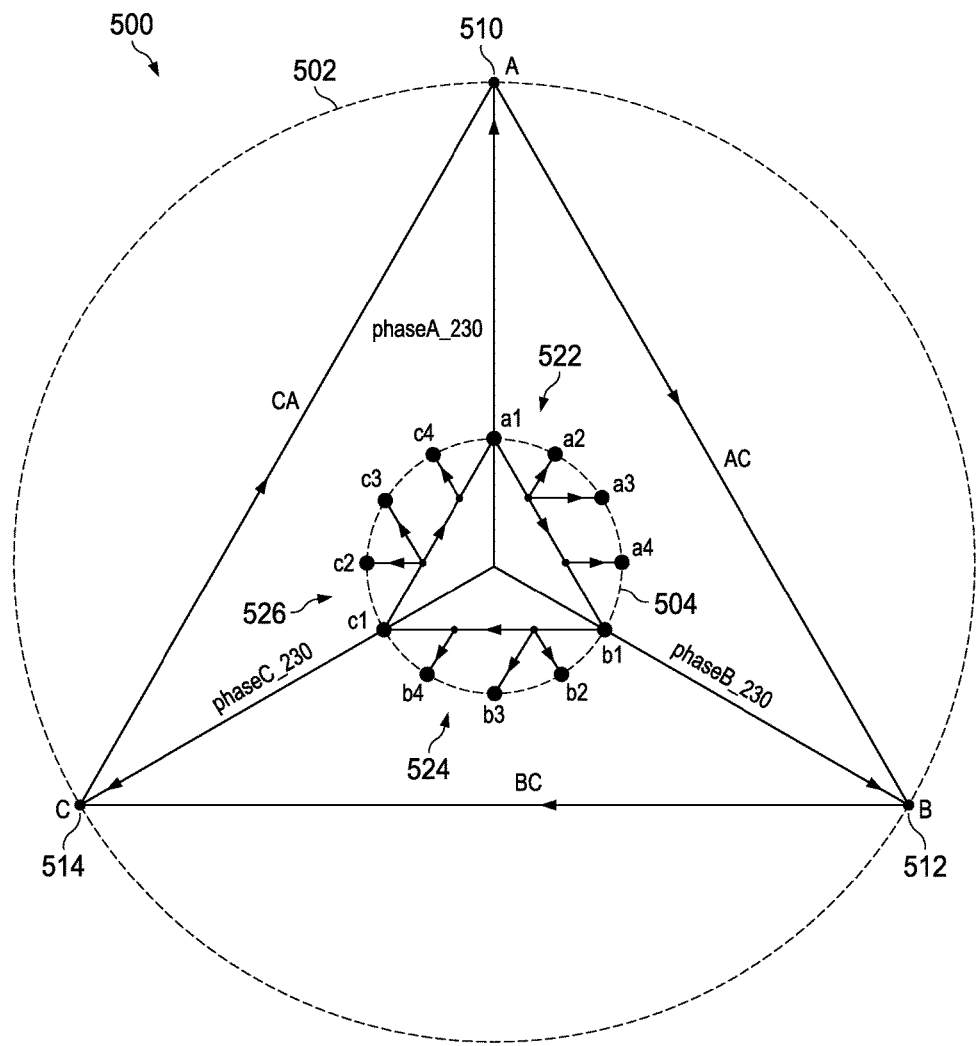
FIG. 5 is an illustration of a phasor diagram of a transformer in accordance with an illustrative embodiment.

Turning to FIG. 5, an illustration of a phasor diagram of a transformer is depicted in accordance with an illustrative embodiment. Phasor diagram 500 illustrates an example of relative phases of signals at various points in transformer 403 in FIG. 4.

Relative phases of signals in the primary windings of the transformer are indicated by the relative positions of points on circle 502. Relative phases of signals in the secondary windings of the transformer are indicated by the relative positions of points on circle 504.

Points 510, 512, and 514 may correspond, for example, to transformer inputs 405, 406, and 407 to primary windings 414, 440, and 465 in FIG. 4. In this example, AC input signals at transformer input points 510, 512, and 514 on the primary windings are 120 degrees apart.

Points 522 may correspond, for example, to points in secondary windings 415 connected to transformer output lines 408 in FIG. 4. Points 524 may correspond, for example, to points in secondary windings 441 connected to transformer output lines 408 in FIG. 4. Points 526 may correspond, for example, to points in secondary windings 466 connected to transformer output lines 408 in FIG. 4. In this example, AC output signals at transformer output points 522, 524, and 526 on the secondary windings are 30 degrees apart.

The illustrations of FIG. 3, FIG. 4, and FIG. 5 are not meant to imply physical or architectural limitations to the manner in which illustrative embodiments may be implemented. Other components in addition to or in place of the ones illustrated may be used. Some components may be optional. Also, blocks are presented in the figures to illustrate some functional components. One or more of these blocks may be combined, divided, or combined and divided into different blocks when implemented in an illustrative embodiment.

For example, illustrative embodiments may comprise a transformer rectifier unit that is configured to receive as input AC power comprising fewer or more than three phases. Illustrative embodiments may comprise a transformer that is configured to provide as output AC signals comprising more or fewer than 24 phases. Illustrative embodiments may comprise a rectifier that is configured to rectify AC signals comprising more or fewer than 24 phases.

Figure 6:
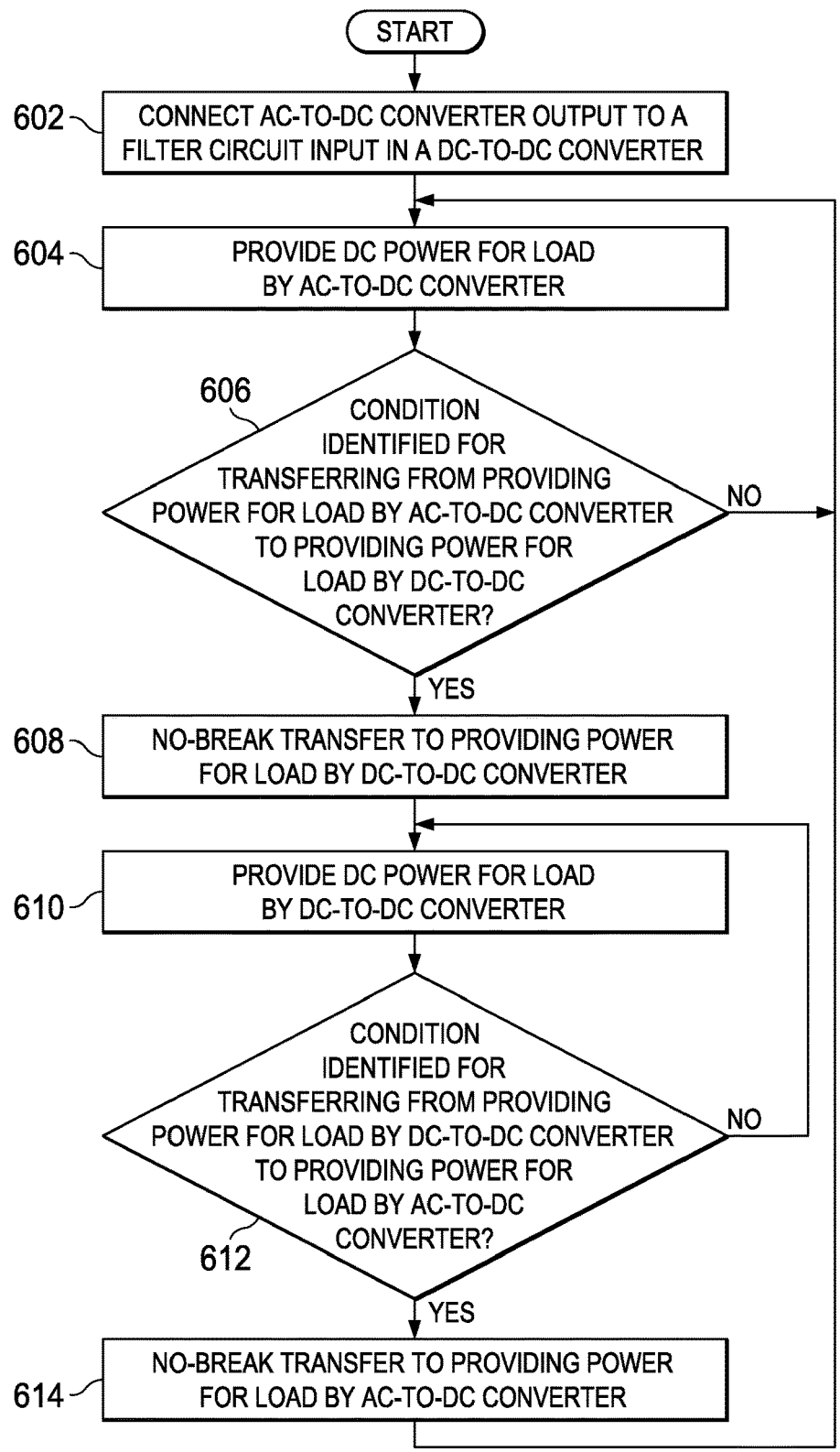
FIG. 6 is an illustration of a flowchart of a process for transferring power in accordance with an illustrative embodiment.

Turning to FIG. 6, an illustration of a flowchart of a process for transferring power is depicted in accordance with an illustrative embodiment. Process 600 may be implemented, for example, in electrical power system 100 in FIG. 1.

Process 600 may begin by connecting an AC-to-DC converter output to a filter circuit input in a DC-to-DC converter (operation 602). The AC-to-DC converter output may or may not be connected to the filter circuit input in the DC-to-DC converter via a switch. DC power then may be provided for a load by the AC-to-DC converter (operation 604). For example, the DC-to-DC converter output may be connected to the load via a DC bus or in another appropriate manner such that the AC-to-DC converter provides the DC power for the load via the filter circuit in the DC-to-DC converter and the DC bus.

It then may be determined whether a condition is identified for transferring from providing power for the load by the AC-to-DC converter to providing power for the load by the DC-to-DC converter (operation 606). For example, without limitation, the condition to be identified in operation 606 may be triggered or identified manually, automatically, or both. In response to a determination that such a condition is not identified, process 600 returns to operation 604, and DC power for the load continues to be provided by the AC-to-DC converter until such a condition is identified.

In response to a determination that the condition in operation 606 is identified, a no-break transfer from providing power for the load by the AC-to-DC converter to providing power for the load by the DC-to-DC converter may be performed (operation 608). For example, without limitation, operation 608 may comprise turning off the AC-to-DC converter and turning on the DC-to-DC converter simultaneously. Alternatively, or in addition, operation 608 may comprise opening a switch in the connection between the AC-to-DC converter and the filter circuit input in the DC-to-DC converter. DC power for the load then may be provided by the DC-to-DC converter (operation 610).

It then may be determined whether a condition is identified for transferring from providing power for the load by the DC-to-DC converter to providing power for the load by the AC-to-DC converter (operation 612). For example, without limitation, the condition to be identified in operation 612 may be triggered or identified manually, automatically, or both. In response to a determination that such a condition is not identified, process 600 returns to operation 610, and DC power for the load continues to be provided by the DC-to-DC converter until such a condition is identified.

In response to a determination that the condition in operation 612 is identified, a no-break transfer from providing power for the load by the DC-to-DC converter to providing power for the load by the AC-to-DC converter may be performed (operation 614). For example, without limitation, operation 614 may comprise turning off the DC-to-DC converter and turning on the AC-to-DC converter simultaneously. Alternatively, or in addition, operation 614 may comprise closing a switch in the connection between the AC-to-DC converter and the filter circuit input in the DC-to-DC converter. Process 600 then may return to operation 604, providing DC power for the load by the AC-to-DC converter.

Turning to FIG. 7, an illustration of a graph of voltage during a prior art power transfer is depicted. Graph 700 shows voltage on y-axis 702 and time on x-axis 704. Line 706 indicates voltage provided for a load by an AC-to-DC converter connected in parallel with a DC-to-DC converter in a conventional manner. In this example, a transfer between providing power for the load by the AC-to-DC converter to providing power for the load by the DC-to-DC converter occurs at time t=4.0 m. Line 706 shows a relatively large voltage drop when the power transfer occurs. This relatively large voltage drop may result in a break in the power provided to the load.

Turning to FIG. 8, an illustration of a graph of voltage during a power transfer is depicted in accordance with an illustrative embodiment. Graph 800 shows voltage on y-axis 802 and time on x-axis 804.

Line 806 indicates voltage provided for a load by the AC-to-DC converter and DC-to-DC converter used to provide power for the load in the example of FIG. 7. In this example, however, the AC-to-DC converter is connected to a filter circuit input in the DC-to-DC converter in accordance with an illustrative embodiment, as illustrated in and described with reference to FIG. 1, for example. In this example, a transfer between providing power for the load by the AC-to-DC converter to providing power for the load by the DC-to-DC converter occurs at time t=4.0 m. Line 806 shows a relatively small voltage drop when the power transfer occurs in this case. This relatively small voltage drop does not result in a break in the power provided to the load. Therefore, line 806 indicates a no-break power transfer in accordance with an illustrative embodiment.

Turning to FIG. 9, an illustration of a graph of output voltage provided by a prior art transformer rectifier unit is depicted. Graph 900 shows voltage on y-axis 902 and time on x-axis 904.

Line 906 shows the voltage ripple at the output of a 12-pulse transformer rectifier unit. Line 908 shows the average voltage at the output of the transformer rectifier unit. The voltage ripple is relatively large in this case.

Turning to FIG. 10, an illustration of a graph of output voltage provided by a transformer rectifier unit is depicted in accordance with an illustrative embodiment. Graph 1000 shows voltage on y-axis 1002 and time on x-axis 1004.

Line 1006 shows voltage ripple at the output of a 24-pulse transformer rectifier unit in accordance with an illustrative embodiment, such as transformer rectifier unit 300 in FIG. 3, for example. Line 1008 shows average voltage for the transformer rectifier unit. The voltage ripple at the output of a 24-pulse transformer rectifier unit in accordance with an illustrative embodiment is less than the voltage ripple produced by 12-pulse transformer rectifier unit as shown in FIG. 9.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus, comprising:
a DC-to-DC converter connected to an input of an inductor-capacitor (LC) filter circuit, the LC filter circuit including an output connected to a load;
an AC-to-DC converter connected to the input of the LC filter circuit via a switch enabling the inductor to include a charge therein by a current going therethrough when the load is powered by the DC-to-DC converter or by the AC-to-DC converter such that there is a low voltage drop when power to the load is switched between the DC-to-DC converter and the AC-to-DC converter, the AC-to-DC converter comprising a transformer and a rectifier, wherein a first number of windings in the transformer is less than a second number of output pulses per cycle of the transformer; and
a controller configured to determine when to turn the switch on and off to provide power to the load from the AC-to-DC converter or from the DC-to-DC converter.

2. The apparatus of claim 1, wherein a no-break power transfer occurs when power to the load is switched from the AC-to-DC converter to the DC-to-DC converter and from the DC-to-DC converter to the AC-to-DC converter.

3. The apparatus of claim 1, wherein the transformer rectifier unit comprises a transformer connected to a rectifier.

4. The apparatus of claim 3, wherein the transformer comprises:
a number of transformer inputs;
a number of sets of windings, wherein each set of windings includes a primary winding and a secondary winding, the primary winding being connected between two of the number of transformer inputs and wherein the secondary winding includes six sub-windings; and
a number of transformer outputs connected to the rectifier, wherein each set of windings in the number of sets of windings includes four outputs in the number of transformer outputs connected each to a sub-winding of the secondary winding, wherein the transformer produces a low ripple voltage, the low ripple voltage disabling the apparatus from switching back and forth between the DC-to-DC converter and the AC-to-DC converter when providing power to the load.

5. The apparatus of claim 1, wherein
the inductor is connected in series between the filter circuit input and the filter circuit output; and
the capacitor is connected between the filter circuit output and ground.

6. The apparatus of claim 1, wherein:
the DC-to-DC converter is configured to provide DC power within a first voltage range in a DC voltage range; and
the AC-to-DC converter is configured to provide DC power within a second voltage range in the DC voltage range, wherein there is a gap between the first voltage range and the second voltage range, the gap delimiting power from the AC-to-DC converter and from the DC-to-DC converter and disabling the apparatus from switching back and forth between the DC-to-DC converter and the AC-to-DC converter when providing power to the load.

7. The apparatus of claim 1, wherein when the controller determines that power is to be provided from the AC-to-DC converter, the controller closes the switch and when the controller determines that power is to be provided from the DC-to-DC converter, the controller opens the switch.

8. The apparatus of claim 1, wherein the AC-to-DC converter is an integral part of an aircraft power system.

9. The apparatus of claim 1, wherein the number of windings in the transformer is 21 and the number of output pulses per cycle of the transformer is 24.

10. A method of transferring power to a load connected to a DC-to-DC converter, comprising:
connecting an AC-to-DC converter output of an AC-to-DC converter to an inductor-capacitor (LC) filter circuit input in the DC-to-DC converter via a switch, wherein the inductor is charged by having a current therethrough when the load is powered by the DC-to-DC converter or by the AC-to-DC converter allowing for a low voltage drop to occur when power to the load is switched from the AC-to-DC converter to the DC-to-DC converter, the AC-to-DC converter comprising a transformer and a rectifier, wherein a first number of windings in the transformer is less than a second number of output pulses per cycle of the transformer;
determining when to provide power to the load from the AC-to-DC converter or from the DC-to-DC converter;
operating the switch to provide power to the load from the AC-to-DC converter in response to determining that power is to be provided to the load from the AC-to-DC converter and power is being provided to the load from the DC-to-DC converter; and
operating the switch to provide power to the load from the DC-to-DC converter in response to determining that power is to be provided to the load from the DC-to-DC converter and power is being provided to the load from the AC-to-DC converter.

11. The method of claim 10, wherein:
the DC-to-DC converter comprises the LC filter circuit and a DC-to-DC converter output;
the LC filter circuit comprises an LC filter circuit output comprising the DC-to-DC converter output, the inductor being connected in series between the LC filter circuit input and the LC filter circuit output, and the capacitor being connected between the LC filter circuit output and ground; and
the load comprises a DC bus connected to the DC-to-DC converter output.

12. The method of claim 10, wherein the AC-to-DC converter comprises a transformer rectifier unit comprising a transformer connected to a rectifier of the AC-to-DC converter, wherein the transformer comprises:
a number of transformer inputs;
a number of sets of windings, wherein each set of windings includes a primary winding and a secondary, the primary winding being connected between two of the number of transformer inputs and the secondary winding including six sub-windings; and
a number of transformer outputs connected to the rectifier of the AC-to-DC converter, wherein each set of windings in the number of sets of windings includes four outputs in the number of transformer outputs connected each to a sub-winding of the secondary winding wherein the transformer rectifier unit produces a low ripple voltage, the low ripple voltage enabling both the DC-to-DC converter and the AC-to-DC converter to be connected to the input of the LC filter circuit by disabling power to the load from switching back and forth between the DC-to-DC converter and the AC-to-DC converter when the switch is enabled to provide power to the load from the AC-to-DC converter.

13. The method of claim 10 further comprising:
providing power for the load by the DC-to-DC converter within a first voltage range in a DC voltage range; and
providing power for the load by the AC-to-DC converter within a second voltage range in the DC voltage range, wherein there is a gap between the first voltage range and the second voltage range, the gap delimiting power from the AC-to-DC converter and from the DC-to-DC converter and disabling power from switching back and forth between the DC-to-DC converter and the AC-to-DC converter when providing power to the load using the AC-to-DC converter.

14. The method of claim 10, wherein the AC-to-DC converter is an integral part of an aircraft power system.

15. The method of claim 10, wherein the number of windings in the transformer is 21 and the number of output pulses per cycle of the transformer is 24.

16. An apparatus, comprising:
a number of transformer inputs;
a number of sets of windings, wherein each set of windings includes a primary winding and a secondary winding, the primary winding being connected between two of the number of transformer inputs and wherein the secondary winding includes six sub-windings; and
a number of transformer outputs comprising four transformer outputs for the each set of windings in the number of sets of windings, wherein each of the four transformer outputs is connected to a number of the sub-windings in the set of windings;
wherein a total number of windings in the number of sets of windings is less than a number of number of output pulses per cycle in the number of transformer outputs.

17. The apparatus of claim 16, wherein:
a transformer comprises three of the transformer inputs, three sets of windings, and twelve of the transformer outputs; and
a number of turns of each of the sub-windings is selected such that a phase of an AC output signal at each one of the transformer outputs leads a phase of an AC output signal at a first other one of the transformer outputs by approximately 30 degrees and lags a phase of an AC output signal at a second other one of the transformer outputs by approximately 30 degrees when phases of AC input signals at the transformer inputs are separated by approximately 120 degrees.

18. The apparatus of claim 16, wherein the sub-windings in the each set of windings comprise:
a first winding comprising a first number of turns connected between a first point and a second point, wherein a first transformer output is connected to the first point;
a second winding comprising a second number of turns connected between the second point and a third point;
a third winding comprising a third number of turns connected between the third point and a fourth point;
a fourth winding comprising a fourth number of turns connected between the second point and a second transformer output;
a fifth winding comprising a fifth number of turns connected between the second point and a third transformer output; and
a sixth winding comprising a sixth number of turns connected between the third point and a fourth transformer output.

19. The apparatus of claim 18, wherein:
the first number of turns, the second number of turns, and the third number of turns are approximately equal; and
the fourth number of turns and the sixth number of turns are approximately equal.

20. The apparatus of claim 19, wherein:
a ratio of the first number of turns to the fourth number of turns is approximately 1:0.772; and
a ratio of the first number turns to the fifth number of turns is approximately 1:1.033.

21. The apparatus of claim 18, wherein:
the first winding, the second winding, and the third winding comprise a single winding comprising a number of turns;
the second point comprises a first tap point on the single winding such that approximately one-third of the number of turns of the single winding are between the first point and the second point; and the third point comprises a second tap point on the single winding such that approximately one-third of the number of turns of the single winding are between the third point and the fourth point.

22. The apparatus of claim 16 further comprising:
a DC-to-DC converter connected to an input of an inductor-capacitor (LC) filter circuit, the LC filter circuit including an output connected to a load;
a rectifier connected to the number of transformer outputs to form an AC-to-DC converter comprising an AC-to-DC converter output; and
a switch physically connecting and disconnecting the AC-to-DC converter output to the LC filter circuit input in the DC-to-DC converter, wherein the inductor is charged by having a current there-through when the load is powered by the DC-to-DC converter or by the AC-to-DC converter allowing for a low voltage drop to occur when power to the load is switched from the AC-to-DC converter to the DC-to-DC converter.

23. The apparatus of claim 16 further comprising:
a DC-to-DC converter connected to a DC bus and configured to provide DC power on the DC bus within a first voltage range in a DC voltage range; and
a rectifier connected to the number of transformer outputs and to form an AC-to-DC converter configured to provide DC power on the DC bus within a second voltage range in the DC voltage range, wherein there is a gap between the first voltage range and the second voltage range, the gap delimiting voltage from the AC-to-DC converter and from the DC-to-DC converter and allowing both the DC-to-DC converter and the AC-to-DC converter to be connected to the input of the LC filter circuit.

* * * * *

UNITED STATES PATENT AND TRADEMARK OFFICE
CERTIFICATE OF CORRECTION

PATENT NO. : 10,050,548 B2
APPLICATION NO. : 14/500376
DATED : August 14, 2018
INVENTOR(S) : Huang et al.

It is certified that error appears in the above-identified patent and that said Letters Patent is hereby corrected as shown below:

In the Claims

Column 18, Lines 8-9, change "the transformer rectifier unit" to -a transformer rectifier unit-
Column 18, Line 9, change "a transformer connected to a rectifier" to -the transformer connected to the rectifier-
Column 19, Line 28, change "a transformer connected to a rectifier" to -the transformer connected to the rectifier- Signed and Sealed this
Fourth Day of December, 2018

Andrei Iancu
*Director of the United States Patent and Trademark Office*